SELF-STARTING AND SUSTAINING FREQUENCY REDUCER

Filed March 17, 1965

INVENTOR
H. I. TILLINGER
BY Edwin B. Cave
ATTORNEY

United States Patent Office 3,293,534
Patented Dec. 20, 1966

3,293,534
SELF-STARTING AND SUSTAINING FREQUENCY REDUCER

Herman I. Tillinger, Morris Township, Morris County, N.J., assignor to Bell Telephone Laboratories Incorporated, New York, N.Y., a corporation of New York Filed Mar. 17, 1965, Ser. No. 440,586
6 Claims. (Cl. 321—69)

This invention relates to frequency reducing systems and more particularly to so-called Fallou-type sub-harmonic generators employed in producing telephone ringing power. A general object of the invention is to improve the starting and load-carrying characteristics of such generators.

The well-known Fallou-type frequency generator usually employs a magnetic-core coil, a capacitor, and a transformer connected in a series-parallel circuit. If the circuit is connected to an alternating current source and the coil is brought into its saturation region, under certain conditions the circuit will oscillate freely at a fundamental frequency F predetermined by the tuning, and also at several harmonics thereof, e.g., 3F, 5F and so forth. If the alternating current supply has a frequency equal to one of these harmonics, for example 3F, the whole system of the fundamental frequency F and its harmonics will be sustained. This circuit is seen to be well suited to producing 20 cycle ringing frequency from 60 cycle line current; and it also exhibits good output waveform and voltage regulation.

A recognized drawback to this circuit is that it is not self-starting; and, accordingly, some outside means must be supplied to initiate the fundamental frequency oscillations. One such means involves applying a transient shock or surge to the circuit through shorting of the inductor coil or through discharge of a condenser. An example of the latter is shown in Patent 2,088,619, issued to C. P. Stocker on August 3, 1937. Another starting method involves an auxiliary starting circuit which applies a voltage at the fundamental frequency to the Fallou circuit, as taught in B. E. Stevens' copending application, Serial No. 153,469 now Patent No. 3,235,785.

However, these and other generally satisfactory starting methods have also exhibited certain disadvantages. The transient shock method, for example, requires a mechanical relay which operates only during starting to effect the desired shock and is otherwise idle, perhaps for prolonged periods. This duty cycle, in which the relay contacts handle large current surges only infrequently and for short duration, has been known to promote contact tarnish and thereby reduce relay reliability. A further objection to all known starting arrangements relates to their sheer bulk and weight, and in some cases to the high noise level which may be produced by auxiliary circuit inductors. Additionally, certain of these starting arrangements do not function effectively under conditions of medium-to-full load.

Accordingly, an object of the invention is to reduce substantially the cost and complexity of inductive-type sub-harmonic frequency generators.

Another object of the invention is to simplify the means for starting such sub-harmonic generators under all loading conditions.

A further object of the invention is to ensure the rapid restarting of such generators following stoppage due to a momentary overload.

A still further object of the invention is to sustain the generation of sub-harmonics in such apparatus more effectively and under conditions of heavier loadings.

A still further object of the invention is to increase the efficiency of such sub-harmonic generators.

These and other objects are accomplished in accordance with the invention by the inclusion in a Fallou-type sub-harmonic frequency generator of a full-time trigger circuit employing a silicon controlled rectifier or the like to initiate and maintain a sub-harmonic oscillations under any loading conditions including full load.

In one illustrative embodiment of the invention, the circuit consists of an inductor and transformer connected in series, with a capacitor connected across windings of the transformer. In this embodiment, a silicon controlled rectifier is connected across a minor portion of the inductor, and its gate is connected to a voltage divider network through a diode. At an appropriate point of a particular half cycle of the alternating current input and at a time when the anode of the SCR is positive with respect to the cathode, the gate circuit conducts, causing the SCR to fire. The minor portion of the inductor is thereby shorted, causing a high current to charge the capacitor. The capacitor then discharges at a sub-harmonic frequency rate (e.g., 20 cycles per second) due to the tuning of the components. The SCR is turned off within the half cycle of the input by the reversing voltage across the anode and cathode. The sub-harmonic frequency is superimposed on the input frequency and the resulting waveform across the resistor divider network triggers the rectifier during each succeeding sub-harmonic half cycle of the same polarity to produce recurrent current surges which maintain the sub-harmonic transient.

Accordingly, a feature of the invention resides in the full-time inclusion in a Fallou-type circuit of a unidirectionally conductive solid state device connected across a portion of the inductor thereof and adapted to fire at least once during each sub-harmonic cycle thereby providing a recurrent starting surge.

Another feature of the invention lies in the inclusion in a Fallou-type circuit of an auxiliary circuit comprising a silicon control rectifier or the like connected across a small portion of the Fallou non-linear inductive element and adapted to fire momentarily near the peak of a selected cycle of the alternating current input, thereby to induce a starting voltage transient without also causing an objectionably strong surge of current.

These and other features are more fully delineated in the detailed description to follow of an illustrative embodiment of the invention and in the drawing in which.

Figure 1:
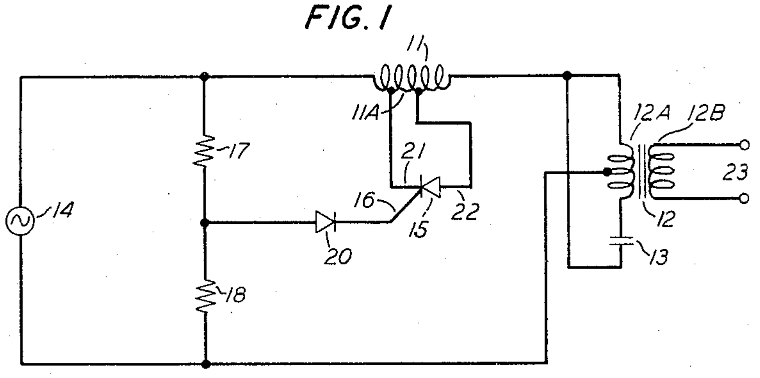
FIG. 1 shows a Fallou-type circuit embodying the invention.

Referring to FIG. 1, the Fallou portion of the circuit consists of a saturating inductor 11 and a coupling transformer 12 with input and output windings 12A and 12B, respectively. A capacitor 13 is connected across input winding 12A. An A.-C. supply voltage, usually at 60 cycles per second and about 117 volts, is designated as 14. The component values are chosen so that when a starting pulse is applied, as will be described, and inductor 11 is driven into saturation, the 60 cycles per second input will initiate a 20 cycles per second fundamental oscillation in this circuit.

In accordance with the invention, a unidirectionally conducting solid state device such as a silicon controlled rectifier 15 is placed across a small portion 11A of the windings (optimally about 6.7%) of inductor 11. Rectifier 15 includes a gate terminal 16, a cathode 21, and an anode 22. Cathode 21 and anode 22 are connected across portion 11A of inductor 11. Gate terminal 16 is connected through a diode 20 to a voltage divider network which consists of series resistors 17 and 18 in parallel with the supply. The resistor values and the connecting points of the SCR to inductor 11 are chosen so that the gate circuit of rectifier 15 will conduct near the peak of the one-half cycle of the A.-C. input in which the SCR anode is positive with respect to the cathode. Rectifier 15 fires, effecting a short circuit of the shunted portion of inductor 11. The short circuit lasts until the current through the SCR drops below the holding current value; and causes a high current to charge capacitor 13 in the Fallou portion. The discharge of capacitor 13 is at the preselected sub-harmonic frequency rate of 20 cycles per second. This output is extracted across winding 12B at terminals 23. Diode 20 is included to limit the reverse gate voltage.

Further aspects of the circuit performance will be apprehended by reference to the several oscillograms in the remaining figures.

The initial starting, in accordance with the invention, takes place essentially as follows. The supply voltage at 60 cycles per second is applied. As this voltage builds up from zero, the voltage across inductor 11, of course, also builds up. At the same time, the voltage between the gate terminal 16 and cathode 21 of the rectifier 15 increases. At some relatively low instantaneous value of input voltage, e.g., 80 volts, the gate-to-cathode voltage is large enough to trigger the SCR and current flows in the gate circuit, causing the rectifier to conduct in a forward direction. The firing causes a short over a portion of inductor 11 at a time when the input voltage across it is near one of its peaks. The resultant sharp current increase adds abruptly to the charge on capacitor 13. This provides the initial Fallou starting condition. Capacitor 13 discharges into the resonant Fallou circuit, tuned to oscillate at a frequency that is a sub-harmonic (e.g., 20 cycles per second) of the input, and the 20 cycles per second is initiated.

Figure 2:
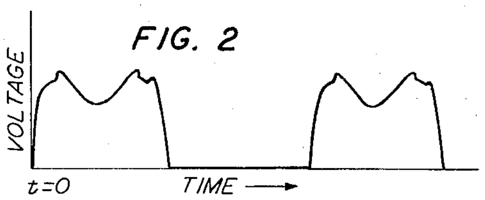
FIG. 2 shows the voltage waveform across the gate and cathode of the rectifier.
Figure 3:
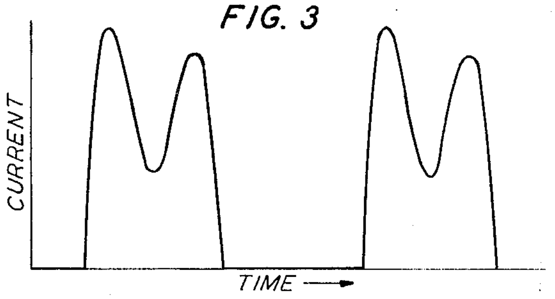
FIG. 3 shows the current waveform in the rectifier gate circuit.
Figure 4:
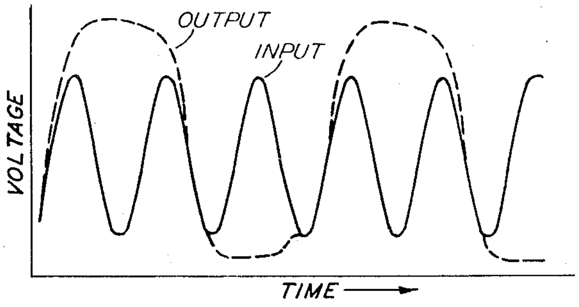
FIG. 4 shows input and output voltage waveform and phase relationship.

In accordance with the invention, the circuit immediately achieves a mode of operation in which a portion of the energy is recurrently applied to sustain the sub-harmonic oscillations. This occurs essentially in the following manner. The starting operation has, as noted, produced a pulse through inductor 11 which, because of the tuning, has the magnitude and timing to sustain the oscillations. The discharge of capacitor 13 into the Fallou portion of the circuit and at the desired sub-harmonic rate is a transient that occurs also across the voltage divider network. The magnitude of the voltage difference across the gate and cathode is such then that the gate circuit will be completely non-conducting during one-half of the sub-harmonic cycle, as seen in FIG. 2. The current waveform of the gate circuit is shown in FIG. 3. The voltage waveform across the gate and cathode is such that at low line voltages, say below 90 volts, only one pulse can occur. At line voltages above 90 volts, the voltage wave across inductor 11 becomes more symmetrical and two pulses occur. The rectifier is thereby triggered twice during each sub-harmonic half cycle of the same polarity at normal input voltages. Of course, no pulses occur on the opposite half cycle since the SCR is non-conductive in the reverse direction. The output waveform at terminals 23 is shown in FIG. 4 superimposed on the input waveform.

Since the SCR is always in the circuit providing not only the starting pulse but also sustaining pulses, the circuit can carry a considerable load without collapse of the fundamental frequency. Experience has indicated that this load-carrying capability is significantly more than that of a circuit using the same coils but arranged to operate in the pure Fallou mode. Furthermore, the shorting portion of the non-linear coil has comparatively few turns, thereby producing input current pulses of relatively low magnitude during normal operation.

This circuit has also demonstrated an unexpectedly strong capacity to start under conditions of full loading, due in large measure no doubt to the continuously recurring starting pulses. Moreover, the circuit regulation is superior not only to the pure Fallou but also to circuits employing the earlier methods of starting. For example, with an input voltage of 105 volts, the pure Fallou circuit produces at no load an output voltage of 89.3 and at a .45 a. load current an output voltage of 84.2. The same figures for the same conditions of loading and using the same Fallou components plus the invention herein described are: 89.9 and 86.0 indicating considerably tighter regulation.

Despite the load-carrying and regulation advantages, the entire apparatus embodying the inventive concept herein described may be produced for considerably less cost than any other known device employed for the same purpose. The invention also enables a large reduction in weight and volume due to the elimination of heavy inductors and relays. For the same reason, the circuit is essentially noiseless.

It is understood that the above-described arrangements are merely illustrative of the application of the principles of the invention. Numerous other arrangements may be devised by those skilled in the art without departing from the spirit and scope of the invention.

What is claimed is:

1. In a frequency reducing circuit having an A.-C. input and including a non-linear impedance element and a resonant circuit containing said element tuned to oscillate at a sub-harmonic frequency of said input, means for starting and sustaining said oscillations comprising, in combination, a unidirectionally conductive solid state device connected across a portion of said impedance element; means including a path for applying said A.-C. input signal to said device for firing said device a first time thereby to initiate said sub-harmonic oscillations; and means including a path for applying said sub-harmonic oscillations to said device for firing said device at least once during each subsequent sub-harmonic half cycle of the same polarity.

2. In a frequency reducing circuit having an A.-C. input and including a saturable impedance element and a resonant circuit containing said element tuned to oscillate at a sub-harmonic frequency of said input, means for starting and sustaining said oscillations in said resonant circuit comprising, in combination, a silicon controlled rectifier connected across a portion of said non-linear impedance; means for firing said rectifier a first time near a peak of one-half cycle of said A.-C. input to produce a current surge in said resonant circuit and thereby induce said sub-harmonic oscillations; and means including the application of said sub-harmonic oscillation to said rectifier for firing said rectifier thereafter at least once during each subsequent sub-harmonic half cycle of the same polarity.

3. A circuit for reducing the frequency of an A.-C. input to a predetermined sub-harmonic thereof comprising, in combination, a resonant circuit tuned to said sub-harmonic frequency and including a non-linear inductance; a unidirectionally conductive solid state device connected across a portion of said inductance and responsive to a predetermined magnitude of said A.-C. input for momentarily shorting said portion of said inductance whereby a transient current surge is produced in said resonant circuit thereby initiating oscillations at said sub-harmonic frequency; and means for superimposing said sub-harmonic oscillations upon said input frequency and for applying the resultant waveform to said device whereby said device is triggered at least once during each sub-harmonic half cycle of the same polarity.

4. A frequency reducing circuit in accordance with claim 3 wherein said resonant circuit further includes a linear inductance in series with said non-linear inductance and a capacitor coupled across said linear inductance.

5. Means for starting and sustaining the operation of a frequency changer, said changer employing a non-linear impedance element and a capacitor for producing oscillations at a discrete sub-harmonic frequency of a specified A.-C. input, said means comprising, in combination, a trigger circuit including a solid state device that is non-conductive in a first direction and conductive in a second direction only in response to a predetermined A.-C. input voltage level of a single polarity, said device being connected across a relatively small portion of said impedance element; means for applying said input voltage to said device whereby near a first input voltage peak said device conducts causing a current surge through said frequency changer thereby initiating a sub-harmonic oscillation therein of a frequency determined by the tuning thereof; and means for continuously supplying all said sub-harmonic oscillations to said trigger circuit whereby said device is rendered non-conductive during one-half of each sub-harmonic cycle and conductive during the succeeding half of each said cycle, and said input voltage thereby supplies a triggering signal at least once during each sub-harmonic half cycle of the same polarity.

6. A frequency changer in accordance with claim 5 wherein said trigger circuit includes a silicon controlled rectifier having its anode and cathode connected across approximately one-tenth of said non-linear impedance element, a voltage divider network connected across said A.-C. input and a diode connected from the center tap of said voltage divider network to the gate of said rectifier.

References Cited by the Examiner

UNITED STATES PATENTS

| | | | |
|---|---|---|---|
| 2,088,618 | 8/1937 | Stocker | 321—69 |
| 3,221,183 | 11/1965 | White | 307—88.5 |

OTHER REFERENCES

Blake, Electronics, "Solid-State Static Power Relays," May 27, 1960. Page 114. 307–88.5–21.5.

NATHAN KAUFMAN, *Primary Examiner.*

J. KOMINSKI, *Assistant Examiner.*